United States Patent
Krauß et al.

(10) Patent No.: US 10,913,388 B2
(45) Date of Patent: Feb. 9, 2021

(54) METHOD FOR ACTUATING AT LEAST ONE MAIN HEADLAMP OF A LIGHTING UNIT OF A MOTOR VEHICLE, LIGHTING UNIT, COMPUTER PROGRAM PRODUCT AND MACHINE-READABLE MEDIUM

(71) Applicant: Hella GmbH & Co. KGaA, Lippstadt (DE)

(72) Inventors: Andreas Krauß, Geseke (DE); Boris Kubitza, Möhnesee-Körbecke (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 16/642,300

(22) PCT Filed: Aug. 20, 2018

(86) PCT No.: PCT/EP2018/072625
§ 371 (c)(1),
(2) Date: Feb. 26, 2020

(87) PCT Pub. No.: WO2019/042834
PCT Pub. Date: Mar. 7, 2019

(65) Prior Publication Data
US 2020/0198526 A1 Jun. 25, 2020

(30) Foreign Application Priority Data
Aug. 29, 2017 (DE) .......................... 10 2017 119 795

(51) Int. Cl.
*B60Q 1/04* (2006.01)
*B60Q 1/14* (2006.01)
(Continued)

(52) U.S. Cl.
CPC .......... *B60Q 1/1423* (2013.01); *H05B 45/10* (2020.01); *F21S 41/153* (2018.01); *F21S 41/663* (2018.01)

(58) Field of Classification Search
CPC .... B60Q 1/1423; F21S 41/153; F21S 41/663; H05B 45/10
See application file for complete search history.

(56) References Cited

U.S. PATENT DOCUMENTS

| | | | |
|---|---|---|---|
| 6,676,282 B2 * | 1/2004 | Begemann | F21S 41/153 362/543 |
| 7,156,542 B2 * | 1/2007 | Miller | B60Q 1/085 362/466 |

(Continued)

FOREIGN PATENT DOCUMENTS

| | | |
|---|---|---|
| DE | 202004010950 U1 | 11/2004 |
| DE | 102013021941 A1 | 7/2015 |

(Continued)

*Primary Examiner* — Kurtis R Bahr
(74) *Attorney, Agent, or Firm* — Husch Blackwell LLP

(57) ABSTRACT

A procedure is provided for actuating at least one main headlamp of a lighting unit for a motor vehicle. An overall light distribution generated by means of at least two segments of a segmented light module is allocated to a light function. The light control switches on or switches off the light function depending on at least one electric input signal of the light control. In order to facilitate the application of an animation of a vehicle lighting for a plurality of vehicle and environmental situations, the overall light distribution of the light function is built up from a plurality of light distribution segments (a-f; a-b; a-c). Each of the light distribution segments (a-f; a-b; a-c) is generated by means of at least one segment of the segmented light module. The plurality of light distribution segments (a-f; a-b; a-c) are switched on and/or switched off by the light control in a previously determined and stored sequence.

8 Claims, 4 Drawing Sheets

(51) Int. Cl.
*H05B 45/10* (2020.01)
*F21S 41/663* (2018.01)
*F21S 41/153* (2018.01)

(56) References Cited

U.S. PATENT DOCUMENTS

| | | | | |
|---|---|---|---|---|
| 9,840,186 | B2 * | 12/2017 | Ichikawa | B60Q 1/1407 |
| 2003/0123706 | A1 * | 7/2003 | Stam | B60Q 1/2603 |
| | | | | 382/104 |
| 2006/0244978 | A1 * | 11/2006 | Yamada | G01S 17/931 |
| | | | | 356/614 |
| 2013/0057149 | A1 * | 3/2013 | Funk | B60Q 1/1415 |
| | | | | 315/82 |
| 2013/0169155 | A1 * | 7/2013 | Nakashima | B60Q 1/14 |
| | | | | 315/82 |
| 2014/0043842 | A1 * | 2/2014 | Mochizuki | F21S 41/698 |
| | | | | 362/543 |
| 2016/0061401 | A1 * | 3/2016 | Seyrlehner | F21S 41/663 |
| | | | | 362/509 |

FOREIGN PATENT DOCUMENTS

| | | | |
|---|---|---|---|
| EP | 1659028 | A1 | 5/2006 |
| EP | 2567866 | A2 | 3/2013 |
| EP | 3088248 | A1 | 11/2016 |
| JP | 2007045252 | A | 2/2007 |

\* cited by examiner

METHOD FOR ACTUATING AT LEAST ONE MAIN HEADLAMP OF A LIGHTING UNIT OF A MOTOR VEHICLE, LIGHTING UNIT, COMPUTER PROGRAM PRODUCT AND MACHINE-READABLE MEDIUM

CROSS REFERENCE

This application claims priority to PCT Application No. PCT/EP2018/072625, filed Aug. 22, 2018, which itself claims priority to German Application No. 10 2017 119795.8, filed Aug. 29, 2017, the entirety of both of which are hereby incorporated by reference.

FIELD OF THE INVENTION

The present invention relates to a procedure for actuating at least one main headlamp of a lighting unit for a vehicle, a lighting device for a vehicle for performing the procedure, and a computer program product and a machine-readable medium.

BACKGROUND

Such procedures for actuating at least one main headlamp of a lighting unit for a vehicle, lighting units, computer program products and machine-readable media are already known from numerous embodiments of the prior art.

For example, a vehicle lighting device is known from DE 10 2013 021 941 A1 for illuminating a vehicle environment by means of which a parking vehicle generates a lighting backdrop for welcoming or taking leave of the vehicle driver. In order to individualize the vehicle equipped with such a system, it is proposed for an interface to be connected to a control unit of the vehicle lighting unit to enable the vehicle driver to enter the corresponding data for the lighting backdrop.

SUMMARY OF THE INVENTION

This is where the present invention comes in.

The present invention is based on the task to make it possible to apply an animation of a vehicle lighting for a plurality of situations relating to the vehicle and its environment.

This task is solved by a procedure for actuating at least one main headlamp of a lighting unit for a motor vehicle with the features of claim 1, a lighting device for a motor vehicle for performing the procedure with the features of claim 9, a computer program product with the features of claim 10 and a machine-readable medium with the features of claim 11. The dependent claims relate to advantageous refinements of the invention.

One significant advantage of the invention is in particular that an animation of the vehicle lighting, i.e. of the area of the vehicle's environment illuminated by a lighting unit of a motor vehicle, can be used for a plurality of situations relating to the vehicle and/or to its surroundings. Accordingly, the animation of the vehicle lighting can be adjusted to the respective situation, whether during travel operation of the motor vehicle or when it is parked.

In principle, the way in which the plurality of light distribution segments of the overall light distribution are switched on and/or switched off by means of the light control can be chosen freely within wide suitable limits. One especially advantageous refinement of the inventive procedure, provides that the plurality of light distribution segments of the overall light distribution be switched on consecutively when the light function is switched on or are switched off consecutively when the light function is switched off. This brings about a clear sequence for the animation that is coherent to the vehicle driver and also to other road users and thus easily understandable.

When switching on a light function and thus a corresponding overall light distribution, such an animation appears as if this overall light distribution is rolled out in front of the vehicle and thus in front of the vehicle driver. The same applies when the light function and thus the corresponding overall light distribution is switched off. In this case, the animation appears as if this overall light distribution is rolled back in front of the motor vehicle. Firstly, this sets the scene for effective vehicle lighting. Secondly, an animation of this kind is easily accepted by the vehicle driver and other road users.

The relative arrangement of the plurality of light distribution segments of the at least one overall light distribution to each other can likewise be chosen freely within wide suitable limits. For reasons of expediency, the light distribution segments of the overall light distribution are arranged parallel to each other and/or diagonally in relation to the longitudinal axis of the motor vehicle.

Another advantageous refinement of the inventive procedure provides that switching on and/or switching off at least one of the light distribution segments of the overall light distribution be performed by means of a previously defined and stored dimming ramp. A gradual transition during switching on and/or switching off of these light distribution segments is achieved in this way. The vehicle driver and also other road users experience such a transition as being more pleasant.

One especially advantageous refinement of the aforementioned embodiment provides that the dimming ramps between two light distribution segments of the overall light distribution that are switched on and/or switched off directly one after the other be designed in such a way that the subsequent light distribution segment is not dimmed up or dimmed down until the preceding light distribution segment has reached a previously determined degree of dimming. This makes it possible to coordinate the transition when switching on and/or switching off adjacent light distribution segments. The overall optical impression is further improved.

Another refinement of the two latter embodiments provided that switching on and/or switching off at least one of the light distribution segments of the overall light distribution be performed by means of a previously defined and stored dimming ramp and for each individual dimming ramp a uniform time period have been determined depending on a previously determined total time period for switching on and/or switching off all light distribution segments of the overall light distribution. In this way, it is possible to coordinate the transitions when switching on and/or switching off all light distribution segments of the at least one overall light distribution to the overall duration of the process of switching on or switching off the corresponding light function and this the corresponding overall light distribution.

An especially advantageous refinement of the inventive procedure provides that the at least one light function takes the form of a light function for travel operation of the motor vehicle, in particular the form of low beam or a high beam. This facilitates an animation of the vehicle lighting, i.e. of an area of the vehicle's surroundings illuminated by a motor vehicle lighting unit, not only when the vehicle is parked but also when the motor vehicle is in travel operation. The way in which the inventive animation can be experienced is further improved.

Another advantageous refinement of the inventive procedure provides that the at least one light function take the form of a presentation light or comprise a presentation function where light distribution segments or the corresponding overall light distribution are at least in some cases switched on and/or switched off several times when switching on and/or when switching off the presentation light or the presentation function. This improves the variability and flexibility of the animation. This can be used advantageously in particular when the vehicle is parked. For example, reference merely needs to be made to the presentation of new motor vehicles at a trade fair.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
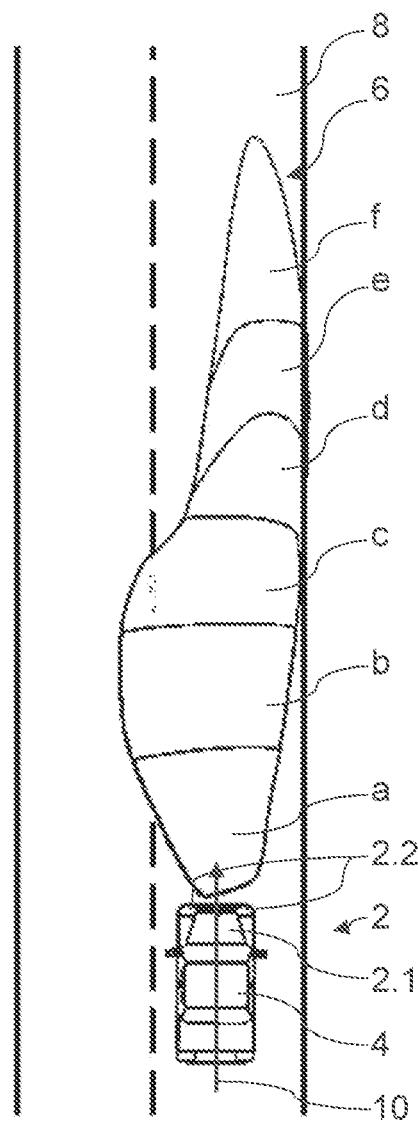
FIG. 1 illustrates a first sample embodiment of an inventive lighting unit for a motor vehicle.

FIG. 1 shows a first sample embodiment of an inventive lighting unit 2 for a motor vehicle 4. The lighting unit 2 features a light control 2.1. and two main headlamps 2.2., where each of the two main headlamps 2.2. comprises a segmented light module with a plurality of segments that can be actuated individually by means of the light control 2.1. The segmented light modules with the individual segments are not shown.

The term "segment" and the words "segmented light module" should in both cases be interpreted broadly. For example, the segments may be LEDs arranged in a matrix and the segmented module may be a module comprising the matrix of LEDs and a projector system as a front optic for the matrix of LEDs. In addition, other suitable segmented light modules known to a specialist are also possible. For example, it would also be conceivable for each of the LEDs in the matrix to have its own front optic. Furthermore, the lighting unit 2 features a memory (likewise not shown) in which a plurality of differing light functions are stored. Among other things, the plurality of light functions comprises a low beam and a high beam.

During operation of the lighting unit 2, the light control 2.1 switches on or off one of the light functions stored in the memory, for example the low beam of the vehicle 4, depending on at least one electric input signal of the light control 2.1 in a way known to the specialist. For example, the driver of the motor vehicle 4 uses an operating element (not shown) to manually switch on or off the low beam or another light function stored in the memory. It is, however, also conceivable that the selection as well as the switching on and/or switching off of the stored light functions can be performed depending on automatically generated input signals of the light control 2.1. For example, reference can be made at this point to procedures and devices known to a specialist that work on the basis of the environmental and/or vehicle sensor systems.

As soon as the vehicle driver has manually set the desired light function by means of the operating element or it has been selected and set by the procedures and devices known to a specialist, the light control 2.1 actuates at least two of the segments of the segmented light module of at least one of the main headlamps 2.2 in such a way that the selected light function of the at least one main headlamp 2.2 is switched on by means of the segmented light module. In the case of low beam and high beam as light functions, the respective segments of the segmented light modules of both main headlamps 2.2 would be actuated.

Each of the light functions stored in the memory is assigned to an overall light distribution 6, where the overall light distribution 6 of the low beam and the high beam are each generated by means of at least two individual segments of the segmented light module. In this context, the overall light distribution 6 is the illuminated area of the surroundings, i.e. for example a road 8 on which the motor vehicle 4 is travelling, that is illuminated by means of the lighting unit 2 and depending on the light function switched on. FIG. 1 shows, as an example, the overall light distribution 6 of the high beam that is composed of six light distribution segments a through f. Together, the light distribution segments a through f give rise to the overall light distribution 6 of the high beam shown in FIG. 1. Each of the light distribution segments a through f is generated by means of at least one of the segments of the segmented light module when the high beam is switched on.

The high beam is now switched on as follows:

The user, for example the vehicle driver of motor vehicle 4, selects the light function high beam, as explained above, by means of the operating element. The corresponding manual adjustment of the operating element switches on the light function high beam. This takes place steplessly, however. The overall light distribution 6 allocated to the high beam is not immediately radiated onto the road 8, i.e. for example, projected onto the road 8 by means of a projector system of the segmented light module, but segments of the segmented light modules of the two main headlamps 2.2 allocated to the light distribution segments a through f of the overall light distribution 6 are actuated by means of the light control 2.1 in such a way, that light distribution segment a is switched on first, followed by light distribution segment b, then light distribution segment c, then light distribution segment d, then light distribution segment e and finally in the sequence light distribution segment e, each one after the other, and radiated onto the road 8. Ultimately, when all light distribution segments a through f have been switched on, the overall light distribution 6 of the high beam can be seen on the road 8. See FIG. 1. The overall light distribution 6 and therefore the high beam are, as it were, rolled out ahead of the motor vehicle 4 and thus ahead of the vehicle driver of the motor vehicle 4.

When the high beam is switched off, the sequence described above will run in the reverse order. The vehicle driver of motor vehicle 4 makes a selection by means of the operating element that the high beam should be switched off. The light control 2.1 actuates the segments of the segmented light modules of the two main headlamps 2.2 allocated to the light distribution segments a through f of the overall light distribution 6 in such a way that light distribution segment f is switched off first, followed by light distribution segment e, then light distribution segment d, then light distribution segment c, then light distribution segment b and finally in the sequence light distribution segment a, each one after the other. Ultimately, when all light distribution segments f through a are switched off, the overall light distribution 6 and therefore the high beam will be switched off. The overall light distribution 6 and therefore the high beam are, as it were, rolled in ahead of the motor vehicle 4 and thus ahead of the vehicle driver of the motor vehicle 4.

In the present sample embodiment, the light distribution segments a through f of the overall light distribution 6 are arranged parallel to each other and the longitudinal axis of the motor vehicle 4. The longitudinal axis of the motor vehicle 4 is shown as a solid line 10 in the Figures. The tip of the arrow of longitudinal axis 10 indicates the direction of travel of the motor vehicle 4.

In order to make the transitions when rolling out and rolling in the overall light distribution 6 of the high beam more fluid, softer, it is provided that the switching on and switching off of all light distribution segments a through f of the overall light distribution 6 of the high beam be performed by means of previously determined and stored dimming ramps. This means the respective light distribution segment a through f is not completely switched on or switched off immediately but stepwise or steplessly, i.e. continuously until the previously determined operating value for the respective light distribution segment a through f. The operating value can be, for example, be the supply of current to the LED of an LED matrix allocated to the at least one actuated segment for the respective light distribution segment a through f.

In this context, the dimming ramps between two light distribution segments a through f of the overall light distribution 6 of the high beam that are switched on and/or switched off directly one after the other are designed in such a way that the subsequent light distribution segment is not dimmed up or dimmed down until the preceding light distribution segment has reached a previously determined degree of dimming. For example, when switching on the high beam, it can be provided that the dimming up of the subsequent light distribution segment does not take place until the previous light distribution segment has already reached 75% of the operating value allocated to this light distribution segment. Correspondingly, the light distribution segment b would not be dimmed up until light distribution segment a has already reached 75% of its operating value. The light distribution segment c would not be dimmed up until light distribution segment b has already reached 75% of its operating value. And so on.

The same applies if the high beam is switched off. Then, for example, the light distribution segment e would not be dimmed down until the supply of current to the LED of the LED matrix allocated to the at least one actuated segment of the light distribution segment f has only 25% of its operating value remaining. The light distribution segment d would not be dimmed down until the supply of current to the LED of the LED matrix allocated to the at least one actuated segment of the light distribution segment e has only 25% of its operating value remaining. And so on.

As stated above, a segment can, for example, take the form of an LED of an LED matrix. In this case, one LED would correspond to one segment of the segmented light module. Embodiments are also conceivable in which a segment comprises further elements, for example a front optic or the like alongside an LED or another light source.

For each of the individual dimming ramps during switching on or switching off of each of the light distribution segments a through f of the overall light distribution 6 of the high beam, a uniform time period has been determined depending on a previously determined total time period for switching on or switching off of all light distribution segments a through f of the overall light distribution 6 when switching on or switching off the high beam.

Figure 2:
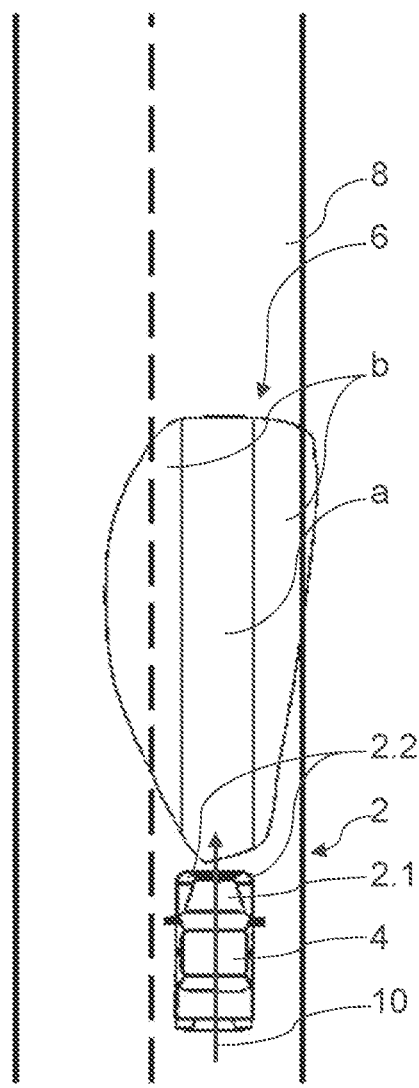
FIG. 2 illustrates a second sample embodiment of an inventive lighting unit.
Figure 3:
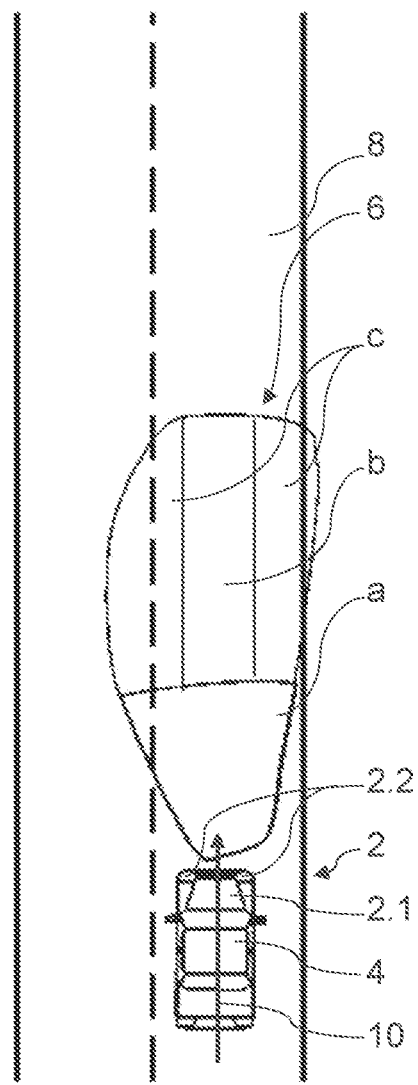
FIG. 3 illustrates a third sample embodiment of an inventive lighting unit.
Figure 4:
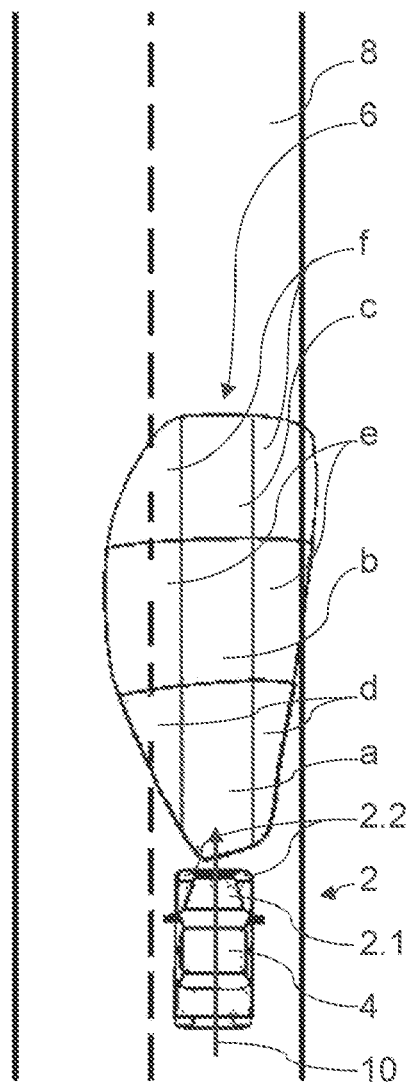
FIG. 4 illustrates a fourth sample embodiment of an inventive lighting unit.

Another three sample embodiments of an inventive lighting unit 2 are explained on the basis of FIG. 2 through 4 as examples, which are also used to provide more information on the inventive procedure. In this context, the explanations are limited to the respective differences to the preceding sample embodiments. Identical and functionally identical components have the same reference signs.

FIG. 2 shows a second sample embodiment of an inventive lighting device 2 in a similar representation to FIG. 1. Here, the light function selected by the vehicle driver by means of the operating element takes the form of a low beam. In this respect, see also FIG. 1. In contrast to the first sample embodiment, the light distribution segments forming the overall light distribution 6 are arranged diagonally to each other in relation to the longitudinal orientation 10 of the motor vehicle 4. Furthermore, the overall light distribution 6 of the low beam features merely two light distribution segments a and b, where light distribution segment a is arranged centrally to two area of light distribution segment b. The two areas of the light distribution segment b are therefor arranged left and right of the light distribution segment a in the image plane of FIG. 2. Switching on and switching off the low beam according to the second sample embodiment is performed in the same way as in the first sample embodiment; i.e. the sequence when switching on the low beam is light distribution segment a first, followed by light distribution segment b, and the reverse order when switching off the low beam.

FIG. 3 shows a third sample embodiment of an inventive lighting unit 2. In line with the second sample embodiment, the light function takes the form of a low beam. Here, in contrast to the two first sample embodiments, not all light distribution segments are parallel to each other or arranged diagonally to each other in relation to the longitudinal axis 10 of the motor vehicle 4, but both parallel to each other and diagonally to each other in relation to the longitudinal axis 10 of the motor vehicle 4. The overall light distribution 6 of the low beam is composed here of three light distribution segments a through c, where the light distribution segment a is arranged in the close-range of the motor vehicle 4, i.e. directly ahead of the motor vehicle 4, and the two other light distribution segments b and c connect directly to the light distribution segment a in the direction of travel 10. Switching on and switching off the low beam according to the third sample embodiment is performed in the same way as in the first and second sample embodiment; i.e. the sequence when switching on the low beam is light distribution segment a first, followed by light distribution segment b and finally light distribution segment c, and the reverse order when switching off the low beam.

FIG. 4 shows a fourth sample embodiment of an inventive lighting device 2. As in the second and third sample embodiment, the light function takes the form of a low beam. In line with the first sample embodiment, the overall light distribution 6 of the low beam features six light distribution segments a through f in this case. Similar to the third sample embodiment, the light distribution segments a through f are parallel to each other and arranged diagonally to each other in relation to the longitudinal axis 10 of the motor vehicle 4. Switching on and switching off the low beam according to the fourth sample embodiment is performed in the same way as in the first, second and third sample embodiment; i.e. the sequence when switching on the low beam is light distribution segment a first, followed by light distribution segment b, then light distribution segment c, then light distribution segment d, then light distribution segment e and finally light distribution segment c, and the reverse order when switching off the low beam.

The invention is not restricted to the present sample embodiments. For example, the design of the lighting unit can be selected freely within wide suitable limits. The same applies to the at least one segmented light module with the segments that can be individually actuated by means of the light control. For example, the segments that can be individually actuated can be of different sizes. It is also conceivable that the segments of the segmented light module take the form of a combination of differing techniques of light generation and light guidance. Generation of the at least one input signal of the light control can likewise be chosen freely within wide suitable limits. This applies in particular to the automatic generation of the at least one input signal depending on vehicle and/or environmental conditions.

Furthermore, it is not mandatory for the plurality of light distribution segments of the at least one overall light distribution to be switched on consecutively when the light function is switched on or to be switched off consecutively when the light function is switched off. For example, it is conceivable that the at least one light function comprises a presentation function where the light distribution segments or the corresponding overall light distribution are at least in some cases switched on and/or switched off several times when switching on and/or when switching off the presentation function. For example, a light function in the form of a high beam could comprise a presentation function when the motor vehicle is in a parked state, by means of which an animation is beamed onto a wall or the light when the vehicle is in a parked state. It is also conceivable that a further light function in the form of a separate presentation light is stored in the memory instead of a presentation function of a stored light function. This makes it possible to advantageously increase the dynamics of the animation, in particular for presentation purposes.

The at least one light function stored in a memory, the corresponding light distribution segments stored in the memory and the at least one dimming ramp stored in the memory for switching on and/or switching off at least one of the light distribution segments can be permanently saved in the memory. It is, however, memory content that can be subsequently changed is also conceivable. For example, the datasets relating to the aforementioned stored content can be subsequently modified or replaced with other datasets. This provides the possibility of personalizing the datasets when the motor vehicle is delivered. Such subsequent modification or replacement of the stored content can be performed in every suitable way known to a specialist. Suitable apps installed on a vehicle driver's smartphone or the like, or modification of the stored content at a vehicle repair shop can be mentioned purely as examples.

The invention also relates to computer program products comprising commands that case the inventive lighting unit to execute the procedure steps of the inventive procedure. The same applies to machine-readable media on which the computer program products are stored.

LIST OF REFERENCE SYMBOLS

2 Lighting unit of the motor vehicle 4
2.1 Light control of the lighting unit 2
2.2 Main headlamp of the lighting unit 2
4 Motor vehicle
6 Overall light distribution of the lighting function
8 Road
10 Longitudinal axis of the motor vehicle 4 with an arrow to indicate the direction of travel of the motor vehicle 4

The invention claimed is:

1. A method for actuating at least one main headlamp of a lighting unit for a motor vehicle, the motor vehicle comprising a light control and at least one main headlamp with a segmented light module featuring a plurality of segments that are adapted to be actuated individually for generating at least one light function stored in a memory, where an overall light distribution generated by means of at least two segments of the segmented light module is allocated to the light function, and where the light control switches on or switches off the light function depending on at least one electric input signal of the light control, the method comprising:
generating a plurality of light distribution segments (a-f; a-b; a-c) via at least one segment of the segmented light module,
switching on and off the light distribution segments (a-f; a-b; a-c) when the light function is switched on or off by the light control in a predetermined and stored sequence to build the overall light distribution of the light function; module and where the plurality of light distribution segments (a-f; a-b; a-c) are switched on and/or switched off when the light function is switched on or switched off by the light control in a previously determined and stored sequence,
wherein switching on and/or switching off at least one of the light distribution segments (a-a-b; a-c) of the overall light distribution is performed by a previously defined and stored dimming ramp, and
wherein the dimming ramps between two light distribution segments (a-f; a-b; a-c) of the overall light distribution that are switched on and/or switched off directly one after the other are designed in such a way that the subsequent light distribution segment (a-f; a-b; a-c) is not dimmed up or dimmed down until the preceding light distribution segment (a-f; a-b; a-c) has reached a previously determined degree of dimming.

2. The method of claim 1, wherein the plurality of light distribution segments (a-f; a-b; a-c) of the overall light distribution are switched on consecutively when the light function is switched on or are switched off consecutively when the light function is switched off.

3. The method of claim 1, wherein the light distribution segments (a-f; a-b; a-c) of the overall light distribution are arranged parallel to each other and/or diagonally in relation to a longitudinal axis of the motor vehicle.

4. The method of claim 1, wherein switching on and/or switching off at least one of the light distribution segments (a-f; a-b; a-c) of the overall light distribution is performed by a previously defined and stored dimming ramp and for each individual dimming ramp a uniform time period has been determined depending on a previously determined total time period for switching on and/or switching off all light distribution segments (a-f; a-b; a-c) of the overall light distribution.

5. The method of claim 1, wherein the at least one light function takes the form of a low beam or a high beam.

6. The method of claim 1, wherein the at least one light function takes the form of a presentation light or comprises a presentation function where light distribution segments or the corresponding overall light distribution are at least in some cases switched on and/or switched off several times when switching on and/or when switching off the presentation light or the presentation function.

7. A lighting unit for a motor vehicle for performing a procedure in accordance with claim 1 comprising:
   a light control; and
   at least one main headlamp with a segmented light module featuring a plurality of segments that can each be actuated individually for generating at least one light function stored in a memory of the lighting unit, where an overall light distribution generated by at least two segments of the segmented light module is allocated to the light function and where the light function can be switched on or switched off by means of the light control depending on at least one electric input signal of the light control;
   wherein the overall light distribution of the light function is built up from a plurality of light distribution segments (a-f; a-b; a-c) where each of the light distribution segments (a-f; a-b; a-c) are generated by at least one segment of the segmented light module and where the plurality of light distribution segments (a-f; a-b; a-c) can be switched on and/or switched off when the light function is switched on or switched off by the light control in a previously determined and stored sequence.

8. A computer program product embodied on a computer readable recording medium for performing the steps of claim 1.

\* \* \* \* \*

UNITED STATES PATENT AND TRADEMARK OFFICE
CERTIFICATE OF CORRECTION

PATENT NO. : 10,913,388 B2
APPLICATION NO. : 16/642300
DATED : February 9, 2021
INVENTOR(S) : Andreas Krauß et al.

Page 1 of 1

It is certified that error appears in the above-identified patent and that said Letters Patent is hereby corrected as shown below:

In the Claims

In Column 8, Lines 33, in Claim 1, delete "(a-a-b; a-c)" and replace with -- (a-f; a-b; a-c) --

Signed and Sealed this
Sixteenth Day of November, 2021

Drew Hirshfeld
*Performing the Functions and Duties of the*
*Under Secretary of Commerce for Intellectual Property and*
*Director of the United States Patent and Trademark Office*